United States Patent
Tamura (10) Patent No.: US 12,480,575 B2
(45) Date of Patent: Nov. 25, 2025

(54) GEAR DEVICE

(71) Applicant: SUMITOMO HEAVY INDUSTRIES, LTD., Tokyo (JP)

(72) Inventor: Mitsuhiro Tamura, Yokosuka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/470,377

(22) Filed: Sep. 19, 2023

(65) Prior Publication Data

US 2024/0141982 A1    May 2, 2024

(30) Foreign Application Priority Data

Oct. 28, 2022  (JP) ................................. 2022-173023

(51) Int. Cl.
  *F16H 57/04*   (2010.01)
  *F16H 55/06*   (2006.01)

(52) U.S. Cl.
  CPC ......... *F16H 57/0464* (2013.01); *F16H 55/06* (2013.01)

(58) Field of Classification Search
  CPC .... F16H 57/0464; F16H 55/06; F16H 49/001; F16C 33/6603; F16C 33/6607
  See application file for complete search history.

(56) References Cited

U.S. PATENT DOCUMENTS

| | | | |
|---|---|---|---|
| 2020/0003288 A1* | 1/2020 | Mendel | F16H 49/001 |
| 2020/0072338 A1* | 3/2020 | Tezuka | F01D 25/18 |
| 2021/0270355 A1* | 9/2021 | Masai | F16H 49/001 |
| 2021/0293326 A1* | 9/2021 | Vijay | F16H 57/0443 |
| 2021/0396304 A1* | 12/2021 | Yamamoto | F16H 49/001 |

FOREIGN PATENT DOCUMENTS

| | | | | |
|---|---|---|---|---|
| CN | 113062959 A | * | 7/2021 | |
| CN | 114245852 A | * | 3/2022 | ............... F16H 1/32 |
| CN | 114562552 A | * | 5/2022 | ........... B29C 70/887 |
| FR | 3116222 A1 | * | 5/2022 | .............. B25J 17/00 |
| JP | 2012-013232 A | | 1/2012 | |
| JP | 2013111694 A | * | 6/2013 | |
| JP | 2018144778 A | * | 9/2018 | ........... B60K 17/046 |
| KR | 20210103696 A | * | 8/2021 | |

* cited by examiner

*Primary Examiner* — Bobby Rushing, Jr.
(74) *Attorney, Agent, or Firm* — HEA Law PLLC (57) ABSTRACT

A gear device that is incorporated in a food machine which is used in a process of handling food, includes a first gear, a second gear that meshes with the first gear, grease that is accommodated in an internal space in which a meshing portion between the first gear and the second gear is present, and a gap portion that allows the internal space to communicate with an external space, in which the first gear is made of fiber-reinforced resin, an accommodation amount of the grease is 1% or more and 30% or less of capacity of a grease accommodation space that is configured by a part of the internal space and accommodates the grease, and the grease is grease that does not correspond to food grease.

13 Claims, 4 Drawing Sheets

GEAR DEVICE

CROSS-REFERENCE TO RELATED APPLICATIONS

This application claims priority to Japanese Patent Application No. 2022-173023, filed on Oct. 28, 2022, which is incorporated by reference herein in its entirety.

BACKGROUND

Technical Field

Certain embodiments of the present invention relate to a gear device that is incorporated in a food machine.

Description of Related Art

The related art discloses a gear device that is incorporated in a food machine. This gear device includes food grease that is accommodated in an internal space in which a meshing portion of a gear pair is present, and an oil seal that seals a grease accommodation space that accommodates the food grease.

SUMMARY

According to an embodiment of the present invention, there is provided a gear device that is incorporated in a food machine which is used in a process of handling food, the device including: a first gear; a second gear that meshes with the first gear; grease that is accommodated in an internal space in which a meshing portion between the first gear and the second gear is present; and a gap portion that allows the internal space to communicate with an external space, in which the first gear is made of fiber-reinforced resin, an accommodation amount of the grease is 1% or more and 30% or less of capacity of a grease accommodation space that is configured by a part of the internal space and accommodates the grease, and the grease is grease that does not correspond to food grease.

DETAILED DESCRIPTION

The inventor of the present application has found, in a gear device that is incorporated in a food machine, a new idea for expanding options of usable grease while achieving a longer service life of the gear device.

It is desirable to provide, in a gear device that is incorporated in a food machine, a technique for expanding options of usable grease while achieving a longer service life of the gear device.

According to the present disclosure, in a gear device that is incorporated in a food machine, it is possible to expand options of usable grease while achieving a longer service life of the gear device.

Hereinafter, embodiments will be described. The same components are denoted by the same reference numerals, and overlapping description is omitted. In each drawing, for convenience of explanation, components are appropriately omitted, enlarged, or reduced. The drawings should be viewed according to the direction of a symbol.

First, the background led to the idea of the gear device of the present disclosure will be described. In the case of a gear device using only metal gears made of metal, it is common general technical knowledge that the accommodation amount of grease that is accommodated within the gear device is usually set to 40% to 50% or more of the capacity of a grease accommodation space (described later) although it varies depending on the type of a gear mechanism. Further, in this case, it is common general technical knowledge that the accommodation amount of grease does not fall below 25% of the capacity of the grease accommodation space even if special measures are taken to reduce it (refer to, for example, Japanese Unexamined Patent Publication No. 2018-144778).

Further, in the related art, there is known a gear device in which a resin gear is made of a single material (non-composite material) using resin, abrasion at a meshing portion between a resin portion of the resin gear and a mating gear is prevented using the self-lubricating properties of resin, and grease that has been used to prevent abrasion of a gear pair is omitted. However, in such a gear device, the intensity of the resin gear is insufficient, and the required service life as a gear device that is incorporated in a food machine cannot be sufficiently secured. On the basis of this, the inventor of the present application has studied the use of fiber-reinforced resin having excellent intensity as the resin for the resin gear in order to secure the intensity of the resin gear. However, it was recognized that in a case where a resin gear made of fiber-reinforced resin is used, if grease is not used, the fibers exposed to the outside of the resin gear invite fiber abrasion that wears out the mating gear that meshes with the resin gear, resulting in a decrease in the service life of the gear device.

The inventor of the present application has recognized that as a countermeasure, it is effective to prevent abrasion of the mating gear due to fiber abrasion by accommodating at least a small amount of grease (grease of 1% or more of the capacity of a grease accommodation space which will be described later). In this way, as compared with a case where the resin gear is made of a single material using resin, it is possible to achieve a longer service life of the gear device by achieving an increase in intensity due to a resin gear made of fiber-reinforced resin and preventing a decrease in the service life of the gear due to fiber abrasion by at least a small amount of grease.

Further, the inventor of the present application has newly found a configuration in which the accommodation amount of the grease is set to the amount (30% or less of the capacity of the grease accommodation space) considerably smaller than a normal numerical range (40% to 50% or more) in the common general technical knowledge while accommodating at least a small amount of grease. The inventor of the present application has newly found that due to the above configuration, it is possible to prevent grease leakage of the gear device while achieving a longer service life of the gear device. In particular, it has been newly found that grease leakage can be prevented even without using a seal member for enclosing grease in the gear device by making the accommodation amount of the grease considerably smaller than the normal numerical range in the common general technical knowledge, as described above. The reason why it is possible to achieve a longer service life of the gear device even with a small grease accommodation amount in this manner is firstly because one gear of a gear pair is set to be a resin gear made of fiber-reinforced resin and abrasion at the meshing portion between the resin portion (non-fiber portion) of the resin gear and the mating gear can be prevented using the self-lubricating properties of resin. Secondly, it is because the fiber abrasion of the mating gear due to the fibers of the resin gear can be prevented by accommodating at least a small amount of grease, as described above. The term "grease leakage" as referred to herein means that grease leaks from the grease accommodation space of the gear device to the external space.

Here, in the gear device that is incorporated in a food machine, it is common general technical knowledge to use food grease (described later) in preparation for grease leakage. The inventor of the present application has obtained a new idea contrary to the common general technical knowledge, in which by preventing grease leakage by making the accommodation amount of the grease considerably smaller than the normal numerical range in the common general technical knowledge while accommodating at least a small amount of grease, as described above, grease other than the food grease, which is common general technical knowledge in gear devices of food machines, can be used while achieving a longer service life of the gear device. Further, the inventor of the present application has found, based on the newly obtained idea, a new configuration in which non-food grease (described later) is used instead of food grease as the grease that is accommodated in the gear device. In this way, as will be described later, it becomes possible to expand options of the types of grease that can be used. Since the non-food grease is more advantageous than the food grease for improving gear performance (including a service life), the gear performance including a longer service life can be improved by using the non-food grease. Hereinafter, the details of a gear device of an embodiment conceived based on such an idea will be described.

Figure 1:
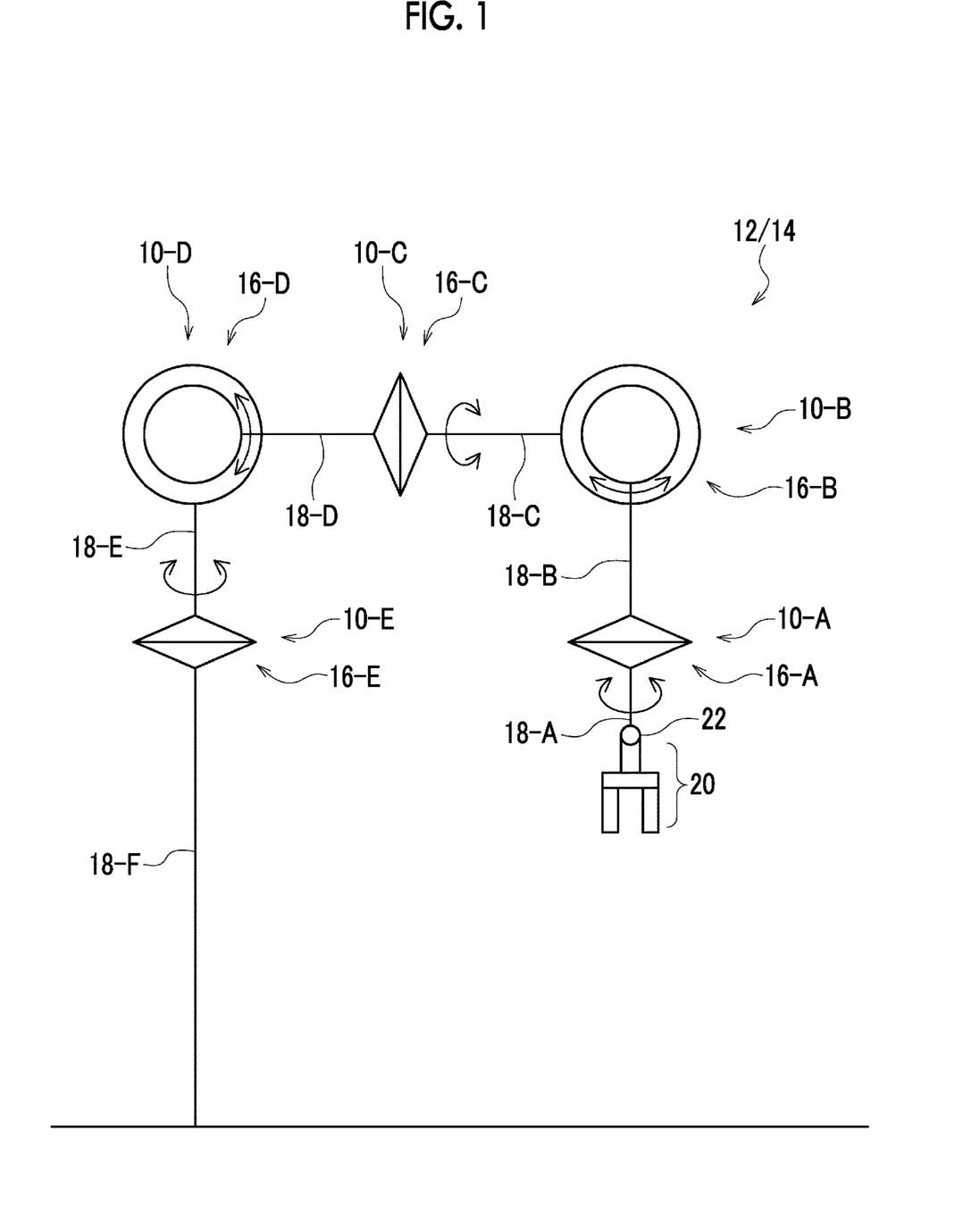
FIG. 1 is a schematic diagram showing a food machine of one embodiment.

FIG. 1 will be referred to. Gear devices 10-A to 10-E are incorporated in a food machine 12 that is used in a process of handling food. The term "food" as referred to herein refers to food that is intended to be put into the mouth by a living thing such as a human, and includes, in addition to general food (including beverages), luxury goods such as cigarettes, pharmaceuticals such as oral preparations, and the like. The term "process of handling food" as referred to herein refers to, for example, a process of performing manufacturing, processing, transport, packaging, filling, inspection, or the like with respect to food. The manufacturing as referred to herein refers to the act of using a raw material and changing its essence into something different. Food processing refers to the act of adding new attributes to food without changing its essence. The food processing includes, for example, cutting, shaping, sorting, crushing, mixing, assorting, subdividing, salting, deboning, surface roasting, freezing, thawing, sticking prevention, or the like of food.

The food machine 12 that is used in such a process of handling food refers to, for example, a robot 14, a washer, a dehydrator, a slicer, a grinder, a chopper, a mixer, an extruder, a conveyor, a sealer, a packaging machine, a transport vehicle, or the like. Here, as the food machine 12, the robot 14 that is used for assorting food will be described as an example. A specific example of the food machine 12 is not particularly limited, and various food machines other than the examples given here may be used.

The robot 14 of the present embodiment is an articulated robot. The robot 14 of the present embodiment has five joints. However, the number of joints is not particularly limited, and may be four or less, six or more, or the like. The robot 14 includes a plurality of joint portions 16-A to 16-E, and a plurality of robot members 18-A to 18-F rotatably connected in series by the plurality of joint portions 16-A to 16-E. The term "rotation" as referred to herein includes "rotation" that rotates in each of a forward direction and a reverse direction. Hereinafter, regarding a plurality of components with the same name, for example, the gear devices are distinguished by stating them as "first stage gear device 10-A", "second stage gear device 10-B", and the like in order from the tip end side to the base end side of the robot 14. The same applies to other components (the joint portions 16-A and the like).

A driving device (not shown) that is driven to rotate each of the robot member 18-A to 18-E on the tip end side among the robot members 18-A to 18-F which are connected at the joint portions 16-A and 16-E is incorporated in each of the plurality of joint portions 16-A to 16-E. Each of the gear devices 10-A to 10-E is incorporated as a part of the driving device of each of the plurality of joint portions 16-A to 16-E, and is used to transmit the power of the driving devices.

The robot member 18-F located on the most base end side among the plurality of robot members 18-A to 18-F serves as a base for supporting the other members of the robot 14, and the robot members 18-A to 18-E other than the robot member 18-F serve as arm members. In the present embodiment, the robot members 18-A to 18-E on the tip end side among the robot members 18-A to 18-F adjacent to each other are connected to be rotatable with respect to the robot members 18-B to 18-F on the base end side at the joint portions 16-A to 16-E.

A mounting portion 22 for detachably mounting an attachment 20 is provided at the robot member 18-A on the most tip end side among the plurality of robot members 18-A to 18-F. The attachment 20 is, for example, a gripping member (gripper) that grips an article such as food. A specific example of the attachment 20 is not particularly limited and may be an attracting member that attracts an article by negative pressure, a magnetic force, or the like, a scooping member that scoops up an article, or the like.

Figure 2:
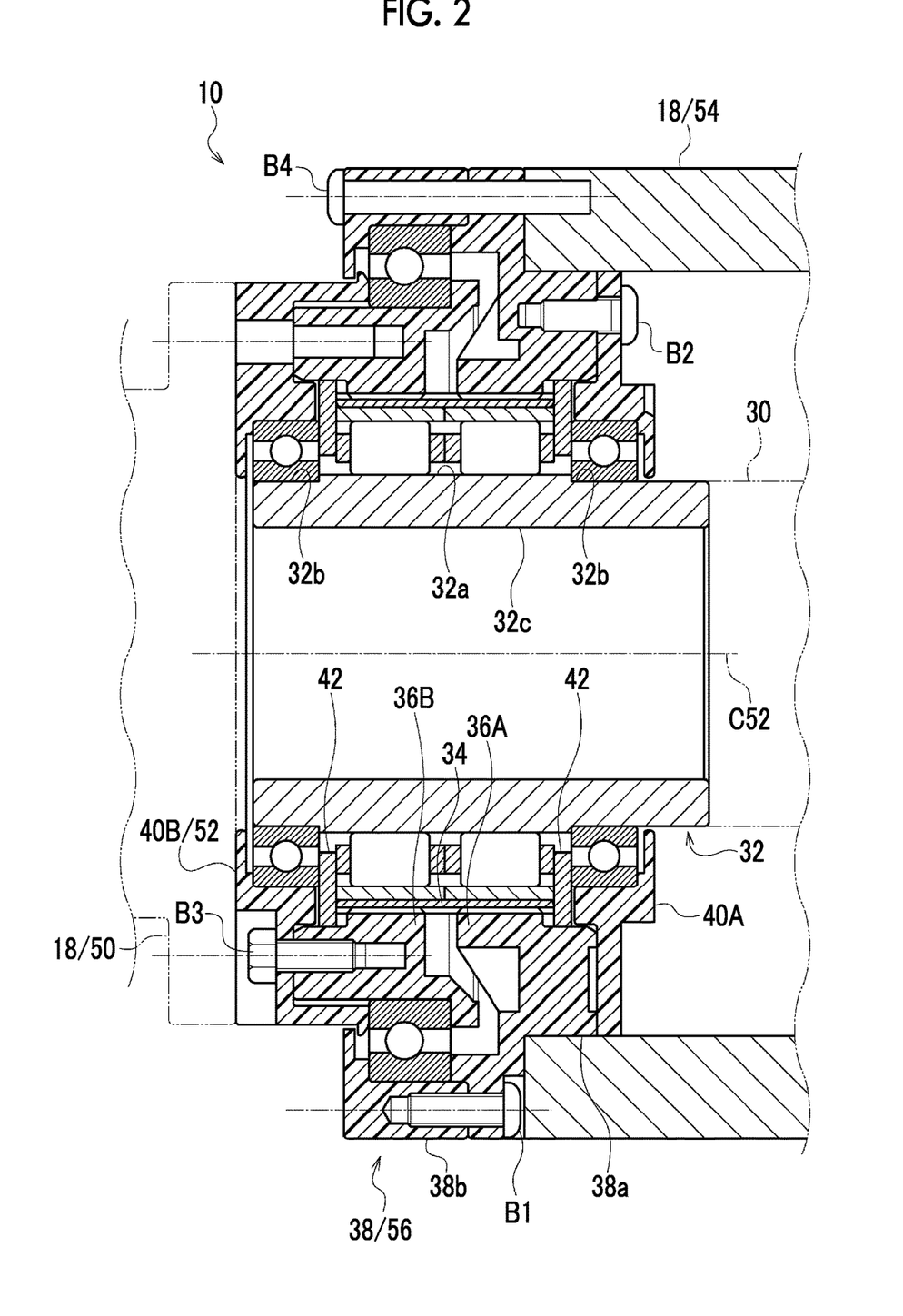
FIG. 2 is a side sectional view showing a gear device of the one embodiment.

FIG. 2 will be referred to. Hereinafter, components common to the plurality of gear devices 10-A to 10-E will be described. In a case where the common components are collectively referred to without distinction, the terms for distinguishing the common components ("first" at the beginning, "-A" at the end, and the like) are omitted. For example, in a case where the gear devices 10-A to 10-E, such as the first stage gear device 10-A, the second stage gear device 10-B, and the like, are collectively referred to, they are simply referred to as a gear device 10. Further, hereinafter, the direction along a rotation center line C52 of an output member 52 (described later) of the gear device 10 is simply referred to as an axial direction, and the radial direction and the circumferential direction with the rotation center line C52 as the center of the circle are simply referred to as a radial direction and a circumferential direction. Further, a drive source 30 side in the axial direction is referred to as an input side, and the opposite side is referred to as a counter input side. In the present embodiment, an example in which all of the plurality of gear devices 10-A to 10-E have the same gear mechanism will be described. The size and reduction ratio in the gear mechanism of each of the gear device 10-A to 10-E differ according to the required torque and required intensity of each joint. The plurality of gear devices 10-A to 10-E may have different gear mechanisms. Further, it is not necessary to adopt the gear device of the present disclosure for all the gear devices 10-A to 10-E, and it is acceptable if the gear device of the present disclosure is adopted for at least some of the gear devices. In this case, it is preferable to adopt the gear device of the present disclosure for the gear device 10-A that is close to food.

The gear device 10 of the present embodiment uses a tubular bending meshing type gear mechanism. The bending meshing type gear device 10 includes a wave generator shaft 32 to which rotation is input from the drive source 30, an external gear 34 which is flexibly deformed by the wave generator shaft 32, and an internal gear for speed change 36A and an output internal gear 36B that mesh with the external gear 34. In addition, the gear device 10 includes a casing 38, an input-side cover 40A, and a counter input-side cover 40B. The drive source 30 of the present embodiment is a motor. However, it may be a gear motor, an engine, or the like.

The wave generator shaft 32 includes a wave generator 32a that flexibly deforms the external gear 34, and shaft portions 32b that are provided on both sides in the axial direction of the wave generator 32a. The wave generator shaft 32 is an example of an input shaft to which rotation is input from the drive source 30. A hollow portion 32c penetrating in the axial direction is formed in the central portion of the wave generator shaft 32. In a cross section orthogonal to the axial direction of the wave generator 32a, the outer peripheral shape of the wave generator 32a is an elliptical shape, and the outer peripheral shape of the shaft portion 32b is a circular shape. The term "ellipse" as referred to herein is not limited to a geometrically strict ellipse, and also includes a substantially ellipsoid shape.

The external gear 34 is a tubular member having flexibility. External teeth are provided on the outer peripheral portion of the external gear 34. Restriction members 42 that restrict the axial movement of the external gear 34 are disposed on both sides in the axial direction of the external gear 34.

Internal teeth that mesh with the external teeth of the input-side portion of the external gear 34 are provided on the inner peripheral portion of the internal gear for speed change 36A. Internal teeth that mesh with the external teeth of the counter input-side portion of the external gear 34 are provided on the inner peripheral portion of the output internal gear 36B. The internal gear for speed change 36A has the number of internal teeth (for example, 102) different from the number of external teeth (for example, 100) of the external gear 34, and the output internal gear 36B has the number of internal teeth that is the same number as the number of external teeth of the external gear 34.

The casing 38 of the present embodiment includes an input-side casing member 38a and a counter input-side casing member 38b. The input-side casing member 38a and the counter input-side casing member 38b are connected by a connection member B1 such as a bolt. The input-side casing member 38a also serves as the internal gear for speed change 36A. The counter input-side casing member 38b is disposed radially outside the output internal gear 36B.

The input-side cover 40A is disposed on the input side in the axial direction with respect to the external gear 34 and covers the external gear 34 from the input side. The input-side cover 40A is connected to the internal gear for speed change 36A by a connection member B2 such as a bolt. The counter input-side cover 40B is disposed on the counter input side in the axial direction with respect to the external gear 34 and covers the external gear 34 from the counter input side. The counter input-side cover 40B is connected to the output internal gear 36B by a connection member B3 such as a bolt.

The gear device 10 includes the output member 52 that outputs rotation to an external driven member 50, and a fixing member 56 that is fixed to an external fixed member 54. In the present embodiment, the driven member 50 and the fixed member 54 are the robot members 18 described above. The output member 52 drives the driven member 50 by outputting rotation to the driven member 50. The output member 52 is one of the casing 38 and the counter input-side cover 40B, and the fixing member 56 is the other of the casing 38 and the counter input-side cover 40B. In the present embodiment, the counter input-side cover 40B is the output member 52, and the casing 38 is the fixing member 56. However, the reverse is also acceptable. The output member 52 is connected to the driven member 50 by using a connection member (not shown) such as a bolt or a rivet. The fixing member 56 is connected to the fixed member 54 by using a connection member B4 such as a bolt or a rivet.

The operation of the gear device 10 described above will be described. When the wave generator 32a of the wave generator shaft 32 rotates, the external gear 34 is flexibly deformed so as to form an elliptical shape matching the shape of the wave generator 32a. When the external gear 34 is flexibly deformed in this manner, the meshing positions between the external gear 34 and the internal gears 36A and 36B change in the rotation direction of the wave generator 32a. At this time, each time the meshing position between the external gear 34 and the internal gear for speed change 36A, which have different numbers of teeth, makes one rotation, the meshing teeth of these gears are shifted in the circumferential direction. As a result, one (in the present embodiment, the external gear 34) of the external gear 34 and the internal gear for speed change 36A rotates, and the axial rotation component thereof is taken out by the output member 52 as output rotation. In the present embodiment, the external gear 34 and the output internal gear 36B synchronize with each other because they have the same number of teeth, and the axial rotation component of the external gear 34 is taken out by the counter input-side cover 40B as the output member 52 through the output internal gear 36B which synchronizes with the external gear 34. At this time, with respect to the input rotation input to the wave generator shaft 32, the output rotation speed-changed (here, speed-reduced) at a change gear ratio corresponding to the difference in number of teeth between the external gear 34 and the internal gear for speed change 36A is taken out by the output member 52.

Figure 3:
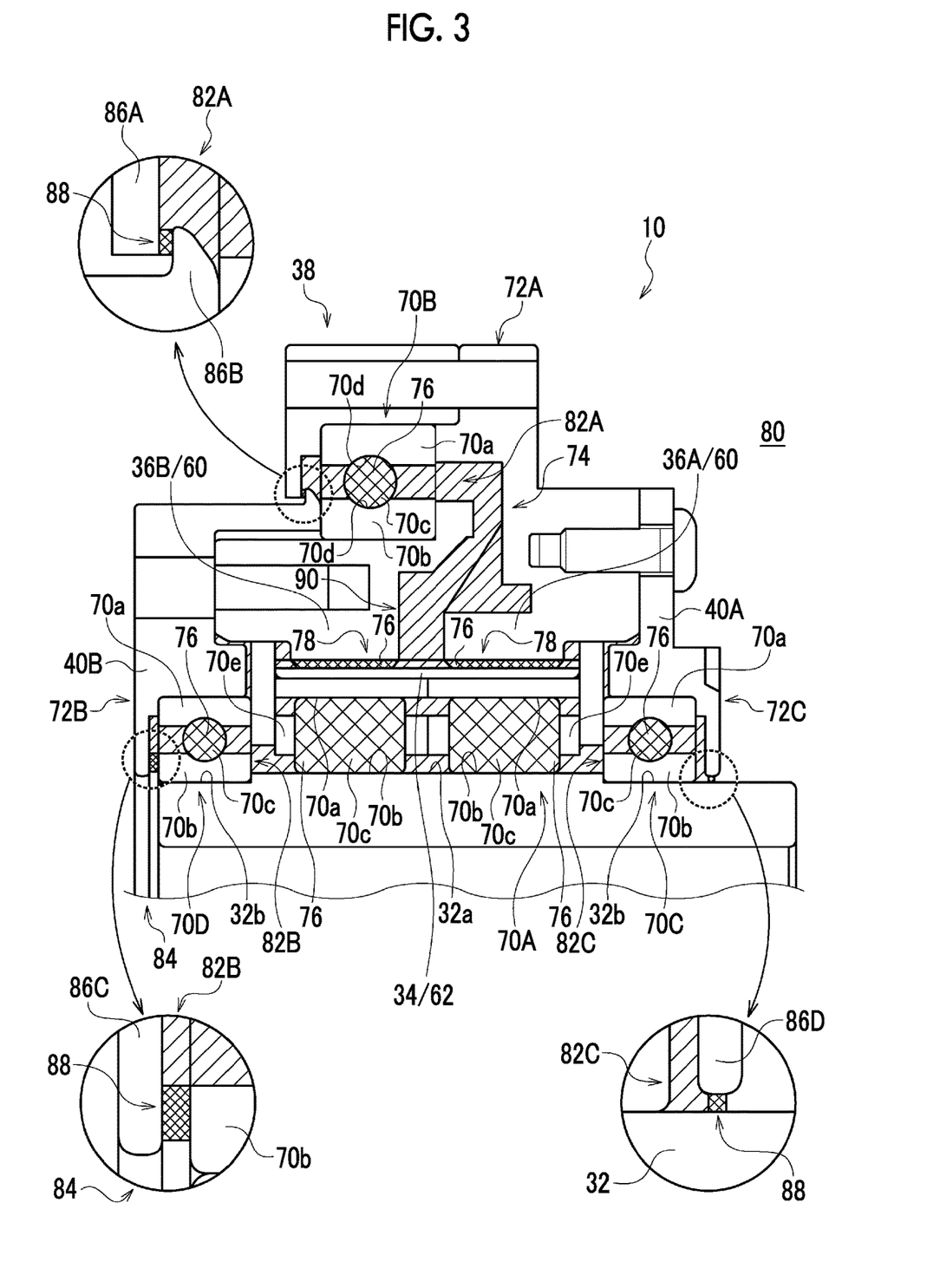
FIG. 3 is an explanatory diagram relating to grease of the one embodiment.

FIG. 3 will be referred to. In FIG. 3, hatching of cross sections of members is omitted for convenience of description. The gear device 10 described above includes a first gear 60 and a second gear 62 that meshes with the first gear 60. The first gear 60 of the present embodiment is each of the internal gear for speed change 36A and the output internal gear 36B, and the second gear 62 is the external gear 34.

The gear device 10 includes at least one of bearings 70A to 70D. The bearings 70A to 70D of the present embodiment include a vibration generating body bearing 70A which is disposed between the wave generator 32a of the wave generator shaft 32 and the external gear 34, and a main bearing 70B which is disposed between the casing 38 and the output internal gear 36B. The bearings 70A to 70D also include an input-side input bearing 70C which is disposed between the input-side cover 40A and the shaft portion 32b of the wave generator shaft 32, and a counter input-side input bearing 70D which is disposed between the counter input-side cover 40B and the shaft portion 32*b* of the wave generator shaft 32. The main bearing 70B is shown as a ball bearing. However, a specific example thereof is not particularly limited, and it may be a roller bearing, a cross roller bearing, an angular ball bearing, a tapered bearing, or the like. The input bearings 70C and 70D are shown as ball bearings, for example. However, specific examples thereof are not particularly limited, and they may be roller bearings, angular ball bearings, tapered bearings, or the like.

Each of the bearings 70A to 70D includes an outer ring 70*a*, an inner ring 70*b*, and rolling elements 70*c* that roll on the outer ring 70*a* and the inner ring 70*b*. Each of the outer ring 70*a* and the inner ring 70*b* is provided with a rolling contact surface 70*d* on which the rolling elements 70*c* roll. Here, for convenience of description, only the rolling contact surface 70*d* of the main bearing 70B is denoted by a reference numeral. Any of the bearings 70A to 70D may have a dedicated outer ring 70*a*, and an outer member which is disposed on the outer periphery side of the rolling element 70*c* may also serve as the outer ring 70*a*. Here, an example is shown in which all the bearings 70A to 70D are provided with the dedicated outer rings 70*a*. Similarly, any of the bearings 70A to 70D may have a dedicated inner ring 70*b*, and an inner member which is disposed on the inner periphery side of the rolling element 70*c* may also serve as the inner ring 70*b*. Here, an example is shown in which the bearings 70B to 70D other than the vibration generating body bearing 70A are provided with the dedicated inner rings 70*b* and the inner member (here, the wave generator 32*a*) also serves as the inner ring 70*b* of the vibration generating body bearing 70A. The vibration generating body bearing 70A of the present embodiment is a double row bearing provided with two outer rings 70*a* and rolling elements 70*c*. The vibration generating body bearing 70A is provided with a retainer 70*e* that holds the positions of the plurality of rolling elements 70*c*.

The gear device 10 includes a plurality of relative rotating bodies 72A to 72C that rotate relative to each other during operation. In the present embodiment, the plurality of relative rotating bodies 72A to 72C include a first relative rotating body 72A that includes the casing 38, a second relative rotating body 72B that includes the counter input-side cover 40B, and a third relative rotating body 72C that includes the wave generator shaft 32. The first relative rotating body 72A includes, in addition to the casing 38, the outer ring 70*a* of the main bearing 70B, the internal gear for speed change 36A, the input-side cover 40A, and the outer ring 70*a* of the input-side input bearing 70C. The second relative rotating body 72B includes, in addition to the counter input-side cover 40B, the internal gear for speed change 36A, the inner ring 70*b* of the main bearing 70B, and the outer ring 70*a* of the counter input-side input bearing 70D. The third relative rotating body 72C includes, in addition to the wave generator 32*a*, the inner ring 70*b* of the counter input-side input bearing 70D, and the inner ring 70*b* of the input-side input bearing 70C. The constituent members of each of the relative rotating bodies 72A to 72C are integrated.

The gear device 10 includes grease 76 that is accommodated in an internal space 74 of the gear device 10. The grease 76 is accommodated in the internal space 74 of the gear device 10, in which a meshing portion 78 between the first gear 60 and the second gear 62 is present. In addition to the meshing portion 78 between the gears 60 and 62, rolling element rolling locations (the rolling elements 70*c* and the rolling contact surfaces 70*d*) of the bearings 70A to 70D of the gear device 10 are present in the internal space 74. The grease 76 is applied not only to the tooth surfaces of the first gear 60 and the second gear 62, but also to the rolling element rolling locations (the rolling elements 70*c* and the rolling contact surfaces 70*d*) of the bearings 70A to 70D. In FIG. 3, the tooth surfaces of the gears 60 and 62 and the rolling elements 70*c*, which are main locations to which the grease 76 is applied, are hatched.

The gear device 10 includes at least one of gap portions 82A to 82C that allow the internal space 74 to communicate with an external space 80 outside the gear device 10. The gap portions 82A to 82C are provided at the locations closest to the external space 80 in the internal space 74 of the gear device 10. The gap portions 82A to 82C allow the internal space 74 to communicate with the external space 80 in a case where it is assumed that the gap portions 82A to 82C are not sealed by seal members, regardless of the presence or absence of the actual seal members of the gap portions 82A to 82C. In the present embodiment, as will be described later, the seal members are not provided in the gap portions 82A to 82C.

The gap portions 82A to 82C are formed between the relative rotating bodies 72A to 72C that rotate relative to each other. The gap portions 82A to 82C of the present embodiment include a low-speed-side gap portion 82A which is formed between a pair of relative rotating bodies 72A and 72B that rotate relative to each other at a first relative rotating speed, and high-speed-side gap portions 82B and 82C which are formed between the relative rotating bodies 72A to 72C that rotate relative to each other at a second relative rotating speed faster than the first relative rotating speed. The low-speed-side gap portion 82A of the present embodiment is formed between the first relative rotating body 72A and the second relative rotating body 72B. The high-speed-side gap portions 82B and 82C of the present embodiment include a first high-speed-side gap portion 82B which is formed between the second relative rotating body 72B and the third relative rotating body 72C, and a second high-speed-side gap portion 82C which is formed between the first relative rotating body 72A and the third relative rotating body 72C. There is a slight difference between the second relative rotating speed of the second relative rotating body 72B and the third relative rotating body 72C and the second relative rotating speed of the first relative rotating body 72A and the third relative rotating body 72C. However, these second relative rotating speeds are much faster than the first relative rotating speeds of the first relative rotating body 72A and the second relative rotating body 72B.

A space which is formed radially inside one of the relative rotating bodies 72A to 72C and is not at a position sandwiched in the axial direction between one of the relative rotating bodies 72A to 72C and the other relative rotating bodies 72A to 72C does not correspond to the gap portions 82A to 82C which form a part of the internal space 74, and is treated as a part of the external space 80. The space that satisfies this condition refers to, for example, a space 84 which is provided radially inside the first high-speed-side gap portion 82B in the counter input-side cover 40B configuring the second relative rotating body 72B, in addition to a space which is formed in the hollow portion 32*c* of the wave generator 32*a* configuring the third relative rotating body 72C.

In the present embodiment, the main bearing 70B (a low-speed-side bearing) that allows relative rotation while holding the interval between the first relative rotating body 72A and the second relative rotating body 72B is provided at the low-speed-side gap portion 82A (on the internal space side thereof). Further, the counter input-side input bearing 70D (a first high-speed-side bearing) that allows relative rotation while holding the interval between the second relative rotating body 72B and the third relative rotating body 72C is provided at the first high-speed-side gap portion 82B (on the internal space side thereof). Further, the input-side input bearing 70C (a second high-speed-side bearing) that allows relative rotation while holding the interval between the first relative rotating body 72A and the third relative rotating body 72C is provided at the second high-speed-side gap portion 82C (on the internal space side thereof). That is, the gap portions 82A to 82C are provided with the bearings 70B to 70D that allow relative rotation while holding the interval between the relative rotating bodies 72A to 72C forming the gap portions 82A to 82C.

The casing 38 (a part of the first relative rotating body 72A) is provided with a first protrusion portion 86A that protrudes radially inward and configures the low-speed-side gap portion 82A. The counter input-side cover 40B (a part of the second relative rotating body 72B) is provided with a second protrusion portion 86B that protrudes radially outward and constitutes the low-speed-side gap portion 82A. The counter input-side cover 40B (a part of the second relative rotating body 72B) is provided with a third protrusion portion 86C that protrudes radially inward and constitutes the first high-speed-side gap portion 82B. The input-side cover 40A (a part of the first relative rotating body 72A) is provided with a fourth protrusion portion 86D that protrudes radially inward and constitutes the second high-speed-side gap portion 82C.

Each of the gap portions 82A to 82C is provided with a minimum gap portion 88 where any one of the axial dimension and the radial dimension is the smallest in each of the gap portions 82A to 82C. Here, the minimum gap portion 88 is indicated by double hatching. The minimum gap portion 88 of the low-speed-side gap portion 82A is provided to be axially sandwiched between the first protrusion portion 86A of the casing 38, in which the axial dimension is the smallest in the low-speed-side gap portion 82A, and the second protrusion portion 86B of the counter input-side cover 40B. The minimum gap portion 88 of the first high-speed-side gap portion 82B is provided to be axially sandwiched between the third protrusion portion 86C of the counter input-side cover 40B, in which the axial dimension is the smallest in the first high-speed-side gap portion 82B, and the inner ring 70b of the counter input-side input bearing 70D. The minimum gap portion 88 of the second high-speed-side gap portion 82C is provided to be radially sandwiched between the fourth protrusion portion 86D of the input-side cover 40A, in which the radial dimension is the smallest in the second high-speed-side gap portion 82C, and the shaft portion 32b of the wave generator shaft 32. The minimum gap portion 88 of any of the gap portions 82A to 82C is provided on the external space 80 side with respect to the bearings 70B to 70D which hold the interval between the relative rotating bodies 72A to 72C forming the gap portions 82A to 82C. For example, this means that the minimum gap portion 88 of the low-speed-side gap portion 82A is provided on the external space 80 side with respect to the main bearing 70B that holds the interval between the first relative rotating body 72A and the second relative rotating body 72B forming the minimum gap portion 88.

The first gear 60 is a resin gear made of fiber-reinforced resin. In this way, it is possible to achieve a reduction in the weight and an increase in the intensity of the first gear 60. The fiber-reinforced resin is formed by incorporating reinforcing fibers into a base resin. Various general-purpose engineering plastics such as polyamide (PA), polycarbonate (PC), and polyacetal (POM), for example, may be adopted as the base resin. In addition, various special engineering plastics such as polyetheretherketone (PEEK), polyamide-imide (PAI), and polyphenylene sulfide (PPS) may be adopted as the base resin. Various reinforcing fibers such as carbon fiber, glass fiber, aramid fiber, polyethylene fiber, Zylon fiber, and boron fiber may be adopted as the reinforcing fiber.

The second gear 62 is made of a metal-based material. The metal-based material as referred to herein refers to a material whose main material is metal. The metal-based material may be composed of only metal (including an alloy) as a main material, or may be composed of a composite material (fiber-reinforced metal or the like) of metal as a main material and other members. The metal that is used here refers to, for example, an iron-based material such as cast iron or steel, or an aluminum-based material such as aluminum or an aluminum alloy. The second gear 62 is made of a metal-based material in this manner, so that it is possible to expect higher intensity of the second gear 62 and a longer service life of the gear device 10, as compared with a case where the second gear 62 is made of a resin-based material. Further, the heat that is generated at the meshing portion can be released through the metal gear having high thermal conductivity, and the abrasion of the resin gear or grease can be suppressed.

The bearings 70A to 70D of the gear device 10 are made of a metal-based material. The bearings 70A to 70D are made of, for example, a steel material such as high-carbon chromium bearing steel as the metal-based material. In order to realize this, in the bearings 70A to 70D, each of the outer ring 70a, the inner ring 70b, the rolling element 70c, and the retainer 70e is made of a metal-based material.

The wave generator 32a, the restriction member 42, the connection members B1 to B3, and the like of the gear device 10 are made of a metal-based material. Further, the casing 38, the counter input-side cover 40B, the input-side cover 40A, and the like of the gear device 10 are made of a resin-based material. The resin-based material as referred to herein refers to a material whose main material is resin. The resin-based material may be composed of only resin as a main material, or may be composed of a composite material of a base resin as a main material and other members. The composite material as referred to herein refers to, for example, a cloth bake, a paper bake, or the like, in addition to the fiber-reinforced resin described above.

In the gear device 10 of the present embodiment, as described above, at least the first gear 60 of the gear pair that includes the first gear 60 and the second gear 62 is a resin gear made of fiber-reinforced resin, and the accommodation amount of the grease is set to be considerably smaller than that in the common general technical knowledge while accommodating at least a small amount of grease 76. In order to realize this, in the present embodiment, the accommodation amount (volume) [ml] of the grease 76 is set as a condition in which it is 1% or more and 30% or less of the capacity (volume) [ml] of a grease accommodation space 90 that is configured by a part of the internal space 74 and accommodates the grease 76.

The term "grease accommodation space 90" as referred to herein refers to a part of the internal space 74 which is located inside the blocked locations in a state where predetermined locations of the gap portions 82A to 82C that allow the internal space 74 to communicate with the external space 80 are blocked. The term "a part of the internal space 74" as referred to herein is a portion in which the grease 76 can stay, and refers to a space excluding the area occupied by members existing in the internal space 74, such as the gears 60 and 62 and the bearings 70A to 70D, in the internal space 74 inside the blocked locations. Here, the grease accommodation space 90 is hatched. The term "predetermined location" as referred to herein refers to a location where a seal member such as an oil seal or a seal bearing is disposed in a case where the seal members are provided in the gap portions 82A to 82C, and the inner side of the internal space 74 with respect to the seal member becomes the grease accommodation space 90. In contrast, the "predetermined location" refers to the minimum gap portion 88 of each of the gap portions 82A to 82C in a case where the seal members are not provided in the gap portions 82A to 82C, and the inner side of the internal space 74 with respect to the minimum gap portion 88 becomes the grease accommodation space 90. The capacity of the grease accommodation space 90 may be specified by the volume of a liquid that can be enclosed in the internal space 74 inside the blocked locations in a state where the predetermined locations of the gap portions 82A to 82C are blocked.

The upper limit value (30%) of the accommodation amount of the grease 76 expresses that it is considerably smaller than the normal numerical range (40 to 50% or more) of the common general technical knowledge, and is for defining a desirable numerical range as a guideline. The upper limit value itself has no special technical significance (critical significance). As will be described later, the accommodation amount of the grease 76 is set to 30% or less of the capacity of the grease accommodation space 90, so that grease leakage of the gear device 10 can be prevented as compared with a case where it is set to the normal numerical range (40 to 50% or more) in the common general technical knowledge, and in this way, the grease 76 other than food grease can be used. In particular, grease leakage can be prevented even without using a seal member for enclosing the grease 76 in the gear device 10.

The lower limit value (1%) of the accommodation amount of the grease 76 expresses that at least a small amount of grease is accommodated as compared with a case where the grease 76 is not used at all, and is for defining a desirable numerical range as a guideline. The lower limit value has no special technical significance (critical significance). As will be described later, the accommodation amount of the grease 76 is set to 1% or more of the volume of the grease accommodation space 90, so that it is possible to expect a longer service life of the gear device due to the prevention of fiber abrasion, as compared with a case where the grease 76 is not used at all.

The accommodation amount of the grease 76 is preferably 3% or more and 20% or less, more preferably 3% or more and 15% or less, and further preferably 4% or more and 10% or less of the capacity of the grease accommodation space 90.

The grease 76 is grease that does not correspond to food grease (hereinafter referred to as non-food grease). The food grease as referred to herein refers to grease approved by a public institution as a lubricant that can be used in locations that come into contact with food, in the standards for lubricants for a food machine. The standards for lubricants for a food machine refer to, for example, NSF H1 and NSF 3H which are the NSF (National Sanitation Foundation) standards. However, other standards that require standards based on these standards may also be used. In the case of NSF H1 and NSF 3H, it can be said that food grease is the grease registered in the NSF as a lubricant that meets the standards required by these standards.

The food grease contains baby oil, white oil, or the like as a base oil and does not contain mineral oil. In contrast, general grease other than the food grease usually contains such mineral oil as base oil. The non-food grease may be regarded as grease containing such mineral oil as base oil. The non-food grease may contain, as an additive, any one of lead, ammonia, cadmium, and nickel, which are components that are used in general grease.

The grease 76 preferably has a certain degree of hardness from the viewpoint of reliably preventing grease leakage in a case where a seal member is not used. From this viewpoint, the consistency number of the grease 76 is preferably No. 1 to No. 6, and more preferably No. 1 to No. 2. The consistency number as referred to herein refers to the number that is obtained by classifying the grease specified in JIS K2220 according to the range of worked penetration. In a case where a seal member is used, the consistency number of the grease 76 may be No. 000 to No. 0.

Locations to which the grease 76 should be applied to prevent abrasion between components in the gear device 10 are the meshing portion 78 of the gear pair and the rolling element rolling locations (the rolling elements 70c and the rolling contact surfaces 70d) of the bearings 70A to 70D. Among these locations, in the rolling element rolling locations of the bearings 70A to 70D, the amount of grease that is required to secure the service life thereof is significantly smaller than that in the meshing portion 78 of the gear pair. Therefore, if the number of bearings 70A to 70D that are used in the gear device 10 is within the range of the number of bearings that are normally used (for example, 2 or more to 6 or less), the service life of the gear device 10 is sufficiently secured by accommodating at least a small amount of grease (1% or more of the capacity of the grease accommodation space 90).

The surface roughness R1 of the rolling element 70c and the rolling contact surface 70d of each of the bearings 70A to 70D is smaller than the surface roughness R2 of the tooth surface configuring the meshing portion 78 between the first gear 60 and the second gear 62. In the present embodiment, this condition is satisfied in all the bearings 70A to 70D. However, it may be satisfied only in at least one of the bearing 70A to 70D. In this way, the amount of grease that is required to secure the service life required for the bearings 70A to 70D can be reduced as compared with a case where the surface roughness R1 in the bearings 70A to 70D is set larger than the surface roughness R2 in the gears 60 and 62. Although the amount of grease that is required to secure the service life of the bearings 70A to 70D is originally small, it can be further reduced. Eventually, a reduction in the accommodation amount of grease that is accommodated in the gear device 10 can be expected.

In the present embodiment, the gap portions 82A to 82C of the gear device 10 are not sealed with seal members. The seal member as referred to herein refers to a member for preventing the grease 76 from flowing out from the grease accommodation space 90 to the external space 80. This condition is satisfied in each of the plurality of gap portions 82A to 82C in the present embodiment. That is, it is satisfied in each of the low-speed-side gap portion 82A, the first high-speed-side gap portion 82B, and the second high-speed-side gap portion 82C. In this manner, the seal members are omitted in the gap portions 82A to 82C of the gear device 10, so that the cost of the gear device 10 can be reduced and a loss due to the sliding of the seal member can be reduced. Further, the seal member is omitted in each of the low-speed-side gap portion 82A and the high-speed-side gap portions 82B and 82C, so that the cost and loss of the gear device 10 can be further reduced.

The effects of the gear device 10 described above will be described. According to the gear device 10 of the present embodiment, by preventing grease leakage by making the accommodation amount of the grease considerably smaller than the normal numerical range in the common general technical knowledge while accommodating at least a small amount of grease, it is possible to use non-food grease instead of food grease. In this way, options of the types of the grease 76 that can be used can be significantly expanded as compared with a case of using food grease, as will be described next, while achieving a longer service life of the gear device as compared with a case where the resin gear is made of a single material using resin.

In the food grease, the types of component (base oil, additive, or the like) that can be used are greatly limited as compared with the case of the non-food grease, and the food grease tends to be inferior in characteristic such as an operating temperature range or a service life. In this regard, by adopting the non-food grease instead of the food grease, it is possible to greatly expand options of the types of component that can be used for the grease 76. That is, it is possible to significantly expand options of the types of the grease 76 that can be used. Further, by selecting the grease 76 having an appropriate component according to the desired characteristics, it is expected possible to easily achieve higher performance related to the characteristics, and also to achieve higher performance and a longer service life of the gear device 10. Further, usually, the food grease is much more expensive than the non-food grease. By adopting the non-food grease instead of the food grease, it is possible to expand options of the grease 76 that can be used, and therefore, by selecting inexpensive non-food grease, it is possible to easily reduce the cost.

Next, a test conducted to confirm the effects of the gear device 10 of the present embodiment will be described. The gear device 10 of the present embodiment has a novel feature in the idea itself running counter to the common general technical knowledge, in which by making the actual grease accommodation amount the amount (30% or less) considerably smaller than that in the common general technical knowledge while accommodating at least a small amount of grease (1% or more) as described above, it is possible to use the grease 76 other than the food grease while securing a service life of the gear device 10. Therefore, as described above, although there is no critical significance in the numerical range itself in which the accommodation amount of the grease is set to 1% or more and 30% or less of the capacity of the grease accommodation space 90, a test was conducted to confirm the effect. In this test, the gear device 10 shown in FIG. 2 was used, and the accommodation amount of the grease 76 was set to 5.4% of the capacity of the grease accommodation space 90. Further, in this test, a load in the forward rotation direction and a load in the reverse rotation direction were repeatedly applied to the output member 52. The load was an average magnitude load that is applied to the gear device 10 incorporated in the food machine 12. As a result, it was confirmed that the service life required for the gear device 10 incorporated in the food machine 12 was satisfied and grease leakage did not occur even without a seal member.

Further, simulation was performed under conditions in which the load and use conditions were variously changed based on the test results. The use conditions as referred to herein refer to the positions (the number of stages) of the joint portions 16-A to 16-E of the articulated robot in which the gear device 10 to be tested is used, the posture of the gear device 10 in the articulated robot 14, and the like. As a result, it was found that there is a situation in which the service life required for the gear device 10 incorporated in the food machine 12 is satisfied even if the accommodation amount of the grease is 1% of the capacity of the grease accommodation space. Further, it was found that there is a situation in which grease leakage of the gear device 10 does not occur even if the accommodation amount of the grease is 30% of the capacity of the grease accommodation space. Further, it has been found that in order to make it possible to cope with various applications in a more versatile manner, the accommodation amount of the grease 76 is preferably 3% or more and 20% or less, more preferably 3% or more and 15% or less, and further preferably 4% or more and 10% or less of the capacity of the grease accommodation space 90.

Another Embodiment

Figure 4:
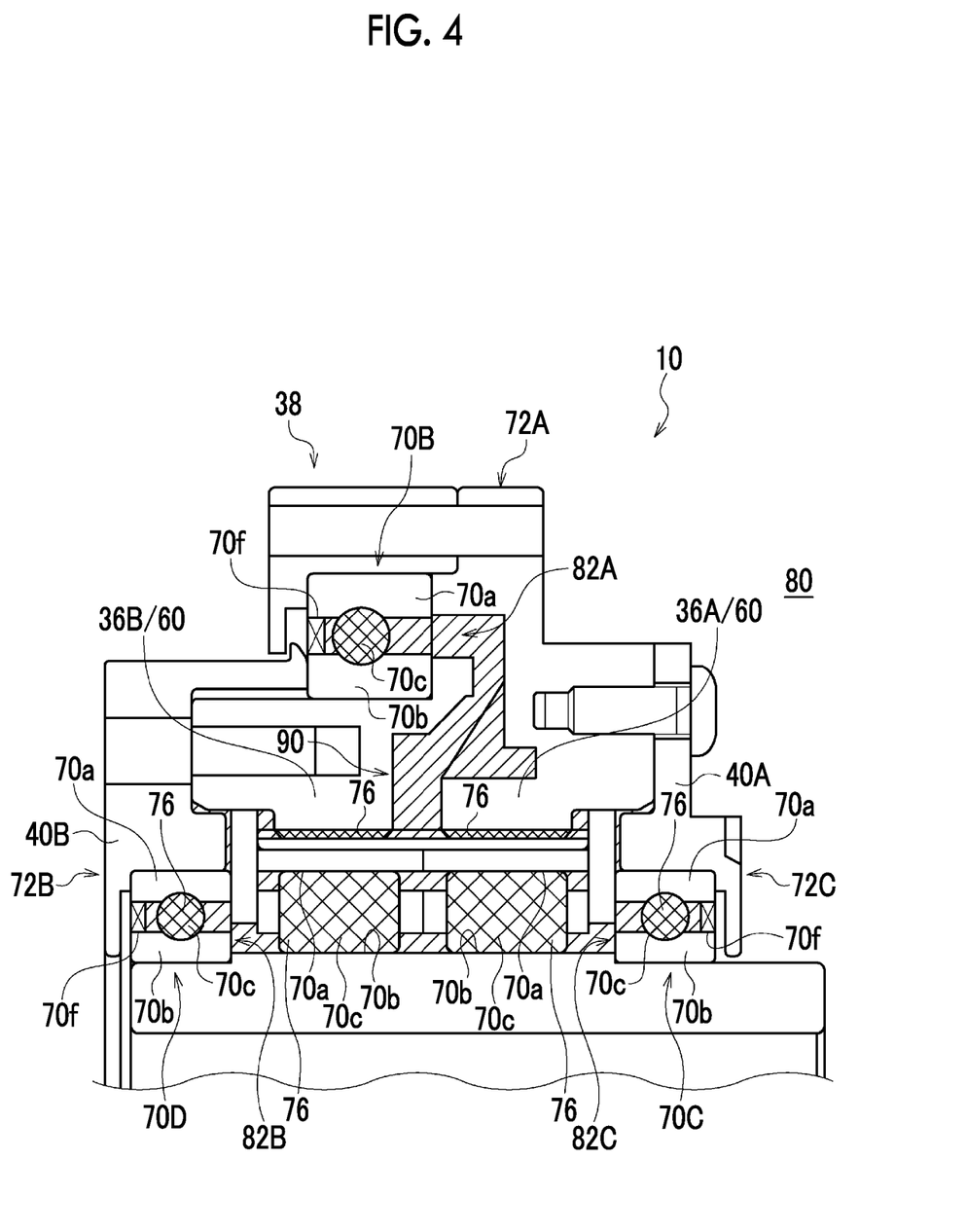
FIG. 4 is a side sectional view showing a gear device of another embodiment.

FIG. 4 will be referred to. Hereinafter, in the subsequent embodiments, the same contents as those in the one embodiment are applied to the components that are not described below, among the components described in the one embodiment. The gear device 10 of the present embodiment is different from the gear device 10 of the one embodiment in terms of the configurations of the main bearing 70B and the input bearings 70C and 70D. The main bearing 70B that is provided at the low-speed-side gap portion 82A is a seal bearing. The input bearings 70C and 70D that are provided at the high-speed-side gap portions 82B and 82C are likewise seal bearings. Here, regarding the configurations common to both parties, the main bearing 70B will be described as an example.

The seal bearing that configures the main bearing 70B includes, in addition to the outer ring 70a, the inner ring 70b, and the rolling elements 70c, a seal material 70f that is disposed between the outer ring 70a and the inner ring 70b. The seal material 70f is for preventing the grease from flowing out from the grease accommodation space 90 to the external space 80. In this manner, the seal bearings are disposed in the gap portions 82A to 82C, so that leakage of the grease accommodated in the grease accommodation space 90 can be more reliably prevented. From such a viewpoint, the seal bearing may be disposed in each of the plurality of gap portions 82A to 82C as in the present embodiment, or the seal bearing may be disposed in at least one of the plurality of gap portions 82A to 82C.

In this manner, the gap portions 82A to 82C of the gear device 10 may be sealed by the seal members. Although a specific example of the seal member is not particularly limited, it may be configured by, for example, an oil seal or the like, in addition to the seal bearing. Further, in a case where some of the plurality of gap portions 82A to 82C are sealed by the seal members, only one of the low-speed-side gap portion 82A and the high-speed-side gap portions 82B and 82C may be sealed by the seal member. In addition, one of the plurality of high-speed-side gap portions 82B and 82C and the low-speed-side gap portion 82A may be sealed by individual seal members.

The grease accommodation space 90 of the present embodiment is provided in the inner side of the internal space 74 with respect to the seal bearings serving as the seal members that are provided in the gap portions 82A to 82C according to the definition described above.

Next, modification forms of each component described so far will be described.

A specific type of the gear mechanism that is used in the gear device 10 is not particularly limited. The gear mechanism may be a simple planetary gear mechanism, an eccentric oscillation gear mechanism, a parallel shaft gear mechanism, an orthogonal shaft gear mechanism, or the like, in addition to the bending meshing type gear mechanism. In the case of the bending meshing type gear mechanism, the specific type thereof is not particularly limited and may be a cup type or a silk hat type, in addition to the tubular type. The bending gear that is flexibly deformed by the wave generator may be an internal gear instead of the external gear. In the case of the eccentric oscillation gear mechanism, the specific type thereof is not particularly limited. As this type, in addition to a center crank type in which a crankshaft is disposed at the rotation center of the output member, a distribution type in which a crankshaft is disposed at a position offset from the rotation center of the output member may be used.

A specific example of the combination of the first gear 60 and the second gear 62 is not particularly limited. The example in which the first gear 60, which is a resin gear, is an internal gear and the second gear 62 is an external gear has been described. However, the first gear 60 may be an external gear and the second gear 62 may be an internal gear. In addition to this, the combination of the first gear 60 and the second gear 62 may be a pair of bevel gears, a rack-and-pinion, a screw gear-and-helical gear, or the like.

With respect to the materials of the constituent members of the gear device 10, it is acceptable if the first gear 60 is made of fiber-reinforced resin, and the materials of other constituent members are not particularly limited. The second gear 62 may be made of a resin-based material such as fiber-reinforced resin, instead of a metal-based material. Other constituent members (for example, the main bearing 70B, the wave generator 32*a*, and the like) of the gear device 10 may also be made of either a metal-based material or a resin-based material.

The surface roughness R1 of the rolling elements 70*c* and the rolling contact surfaces 70*d* of the bearings 70A to 70D may be equal to or greater than the surface roughness R2 of the tooth surfaces of the first gear 60 and the second gear 62.

The embodiments and modification forms described above are exemplification. The technical ideas that abstract these should not be construed as being limited to the contents of the embodiments and modification forms. Many design changes such as a change, addition, and deletion of a component are possible with respect to the contents of the embodiments and modification forms. In the embodiments described above, the notation of "embodiment" is added to emphasize the contents that allow such design changes. However, design changes are permitted even in the contents in which there is no such notation.

It should be understood that the invention is not limited to the above-described embodiment, but may be modified into various forms on the basis of the spirit of the invention. Additionally, the modifications are included in the scope of the invention.

What is claimed is:

1. A gear device comprising:
   a first gear;
   a second gear that meshes with the first gear;
   grease that is accommodated in an internal space in which a meshing portion between the first gear and the second gear is present; and
   a gap portion that allows the internal space to communicate with an external space;
   wherein the first gear is made of fiber-reinforced resin,
   an accommodation amount of the grease is 3% or more and 15% or less of capacity of a grease accommodation space that is configured by a part of the internal space and accommodates the grease,
   the grease is not food grease, and
   wherein said gear device is configured to be used in a food machine and is further configured to be used in a process for handling food; and
   wherein the gap portion is not sealed by a seal member in a state where the gear device is already incorporated in the food machine.

2. The gear device according to claim 1,
   wherein the gap portion includes a low-speed-side gap portion formed between a first pair of relative rotating bodies that rotate relative to each other at a first relative rotating speed, and a high-speed-side gap portion formed between a second pair of relative rotating bodies that rotate relative to each other at a second relative rotating speed faster than the first relative rotating speed.

3. The gear device according to claim 1,
   wherein the grease accommodated in the grease accommodation space is only grease with a consistency number of No. 1 to No. 2.

4. The gear device according to claim 1,
   wherein the second gear is made of a metal-based material.

5. The gear device according to claim 1, further comprising:
   a bearing made of a metal-based material,
   wherein surface roughness of a rolling element and a rolling contact surface of the bearing is smaller than surface roughness of tooth surfaces of the first gear and the second gear.

6. The gear device according to claim 1, further comprising:
   an input shaft to which rotation is input from a drive source, and
   an input-side cover disposed on an input side in the axial direction with respect to the first gear and the second gear, supports the input shaft via an input-side input bearing,
   wherein the input side cover is provided with a fourth protrusion portion that protrudes radially inward, and
   wherein the gap portion is provided to be racially sandwiched between the fourth protrusion portion and the input shaft.

7. The gear device according to claim 1, wherein the portion is provided with a minimum gap portion where one of an axial dimension and a radial dimension is the smallest in the gap portion.

8. The gear device according to claim 7, further comprising:
   an input shaft to which rotation is input from a drive source,
   a counter input-side cover disposed on a counter input side in the axial direction with respect to the first gear and the second gear, supports the input shaft via a counter input-side input bearing, and
   a casing rotating relative to the counter input-side cover,
   wherein the casing is provided with a first protrusion portion that protrudes radially inward,
   wherein the counter input-side cover is provided with a second protrusion portion that protrudes radially outward, and where the minimum gap portion is provided to be axially sandwiched between the first protrusion portion and the second protrusion portion.

9. The gear device according to claim 7, further comprising
an input shaft to which rotation is input from a drive source, and
a counter input-side cover disposed on a counter input side in the axial direction with respect to the first gear and the second gear, supports the input shaft via a counter input-side input bearing,
wherein the counter input-side cover is provided with a third protrusion portion that protrudes radially inward, and
wherein the minimum gap portion is provided to be axially sandwiched between the third protrusion portion and the counter input-side input bearing.

10. A food machine comprising:
a joint portion; and
gear device incorporated as a part of a driving device of the joint portion, and is used to transmit the power of the driving device,
the gear device comprising:
a first gear;
a second gear that meshes with be first gear;
grease that is accommodated in an internal space in which a meshing portion between the first gear and the second gear is present; and
a gap portion that allows the internal space to communicate with an external space,
wherein the first gear is made of fiber-reinforced resin,
an accommodation amount of the grease is 3% or more and 15% or less of capacity of a grease accommodation space that is configured by a part of the internal space and accommodates the grease, and
the grease is not food grease;
wherein said gear device is incorporated the food machine and is configured to be used in a process for handling food; and
wherein the gap portion is not sealed by a seal member when the gear device is already incorporated in the food machine.

11. The food machine according to claim 10,
wherein the food machine is an articulated robot which includes a plurality of the joint portions, and
wherein the driving machine is driven to rotate a tip end side robot member among two robot members which are connected at the joint member.

12. The food machine according to claim 11,
wherein the tip end side robot member is provided with a gripping member for gripping food.

13. The food machine according to claim 11,
wherein the tip end side robot member is provided with a mounting portion for detachably mounting an attachment for handling food.

* * * * *